(12) United States Patent
Hong et al.

(10) Patent No.: US 7,350,222 B2
(45) Date of Patent: Mar. 25, 2008

(54) ACTUATOR OF OPTICAL PICK-UP DEVICE

(75) Inventors: Sam Nyol Hong, Suwon-si (KR); In Ho Choi, Seongnam-si (KR); Kyung Taek Lee, Yongin-si (KR)

(73) Assignee: LG Electronics, Inc., Seoul (KR)

( * ) Notice: Subject to any disclaimer, the term of this patent is extended or adjusted under 35 U.S.C. 154(b) by 581 days.

(21) Appl. No.: 10/961,951

(22) Filed: Oct. 7, 2004

(65) Prior Publication Data

US 2005/0078571 A1   Apr. 14, 2005

(30) Foreign Application Priority Data

| Oct. 9, 2003 | (KR) | ...................... 10-2003-0070346 |
| Jan. 14, 2004 | (KR) | ...................... 10-2004-0002676 |
| Jan. 14, 2004 | (KR) | ...................... 10-2004-0002677 |

(51) Int. Cl.
*G11B 7/085* (2006.01)

(52) U.S. Cl. ..................................................... 720/684
(58) Field of Classification Search ...................... None
See application file for complete search history.

(56) References Cited

U.S. PATENT DOCUMENTS

| 5,046,820 | A | 9/1991 | Saekusa |
| 5,446,721 | A | 8/1995 | Sekimoto |
| 5,745,447 | A * | 4/1998 | Kang ....................... 369/44.15 |
| 6,496,451 | B2 * | 12/2002 | Kimura et al. ........... 369/44.14 |
| 2001/0040858 | A1 * | 11/2001 | Son et al. .................... 369/244 |
| 2002/0021651 | A1 | 2/2002 | Hong et al. |
| 2003/0234990 | A1 * | 12/2003 | Akanuma .................... 359/819 |

FOREIGN PATENT DOCUMENTS

JP    06-162538 A    6/1994

* cited by examiner

*Primary Examiner*—Allen Cao
(74) *Attorney, Agent, or Firm*—Lee, Hong, Degerman, Kang & Schmadeka (57) ABSTRACT

An actuator of an optical pick-up device includes two fixing frames, a lens holder disposed between the fixing frames and provided with a focus lens and coils, springs supporting the lens holder, the springs connecting two points of each fixing frame to the lens holder, each spring having one or more bends, a permanent magnet disposed facing the coils to generate magnetic field, and a yoke forming a path of the magnetic field generated by the permanent magnet.

17 Claims, 14 Drawing Sheets

FIG.1

(RELATED ART)

FIG.2

(RELATED ART)

FIG.3

(RELATED ART)

FIG.4

(RELATED ART)

FIG.5

(RELATED ART)

FIG.6

(RELATED ART)

ACTUATOR OF OPTICAL PICK-UP DEVICE

CROSS REFERENCE TO RELATED APPLICATIONS

Pursuant to 35 U.S.C. § 119(a), this application claims the benefit of earlier filing dates and right of priority to Korean Application No. 10-2003-0070346, filed on Oct. 9, 2003, Korean Application No. 10-2004-0002676, filed on Jan. 14, 2004, Korean Application No. 10-2004-0002677, filed on Jan. 14, 2004, the contents of which are hereby incorporated by reference herein in their entirety.

BACKGROUND OF THE INVENTION

1. Field of the Invention

The present invention relates to an actuator used for driving an optical pick-up device writing or reading data on or from an optical disk.

2. Description of the Related Art

Generally, an optical pick-up device is used for a computer, a digital video disk (DVD) player and the like to write and read data on or from an optical disk such as a compact disk, a digital video disk, a blue ray disk, and so forth.

In recent years, as a digital device such as a laptop computer, a camcorder and a digital camera has been reduced in weight and size, it has required to miniaturize the size of the data storage reading/writing device.

Particularly, it has been continuously studied to apply the optical disk to a mobile device such as a mobile phone and a personal digital assistant (PDA). In order to apply the optical disk to such a mobile device, it is badly required to miniaturize the size of the optical pick-up device.

The size reduction of the optical pick-up device has been hobbled by an actuator for moving a focus lens to uniformly maintain a distance between the focus lens and the optical disk and tracing a track on the optical disk to write or read data on or from the optical disk.

The optical pick-up device converts a laser beam eradiated from a laser diode into an optical signal and further converts the optical signal into an electrical signal, thereby reading the recorded data.

The actuator of the optical pick-up device is designed to two-dimensionally move in focusing and tracking directions to safely focus the laser beam on the optical disk even when outer impact is applied. In recent years, to provide more precise motion, an actuator that can move in rolling and pitching directions as well as in the focusing and tracking directions has been developed.

FIGS. 1 through 4 shows a prior optical writing/reading device.

Figure 1:
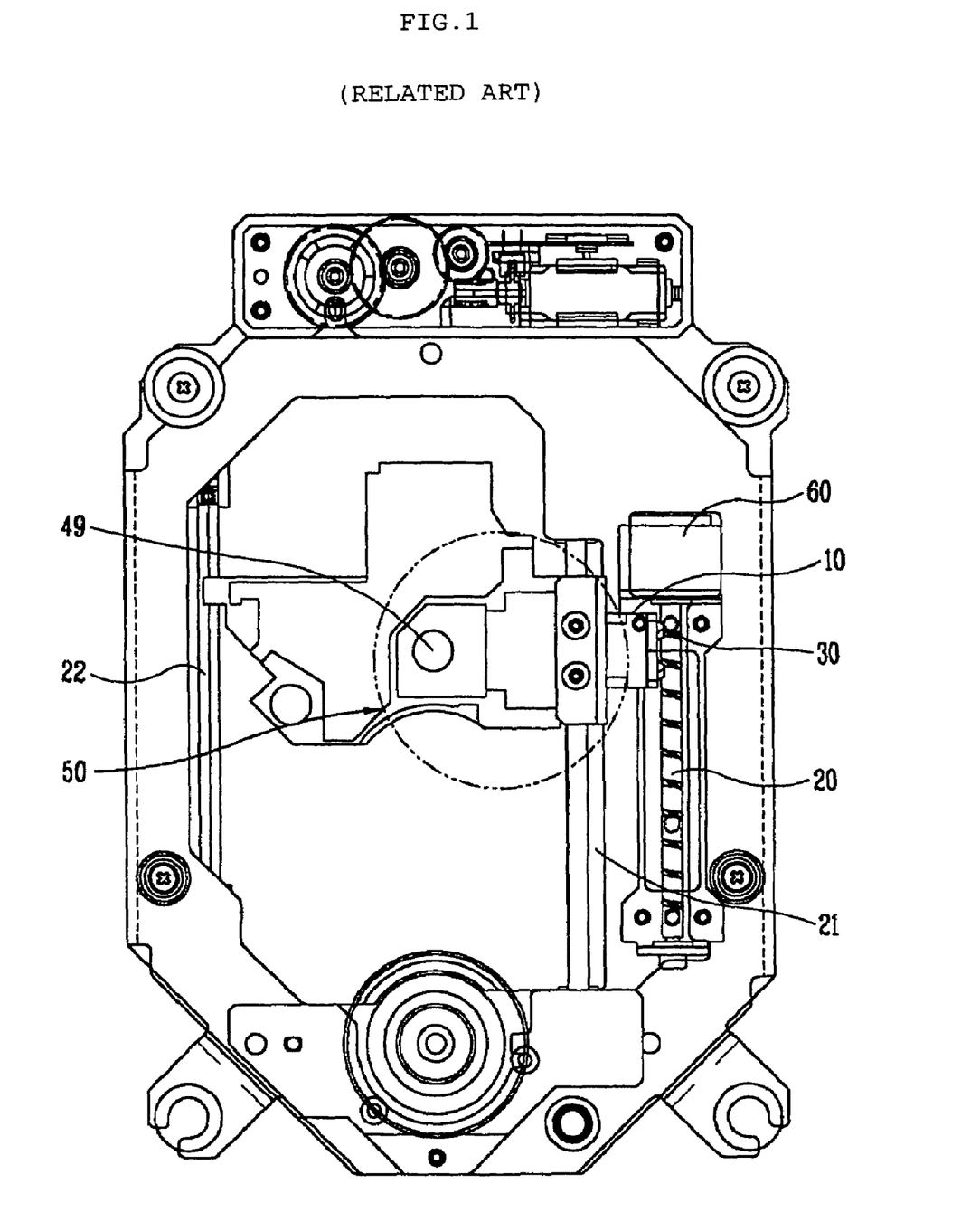
FIG. 1 is a plane view of a prior optical writing/reading device.

A prior optical writing/reading device includes an optical pick-up device 50, an optical pick-up motor 60 for moving the optical pick-up device to a proper position, a lead screw 20 connected to a rotational shaft of the optical pick-up motor 60, a rack gear 30 engaged with the lead screw 20, a guide feeder 10 coupled to the rack gear 30, an optical pick-up moving shaft 21 guiding a reciprocal motion of the guide feeder 10, and a main shaft 22 installed on an opposite side of the optical pick moving shaft 21 to guide the motion of the optical pick-up device.

As the optical pick up motor 60 is operated, the lead screw 20 rotates and the rack gear 30 engaged with the lead screw 20 moves, thereby moving the optical pick-up device 50 to a desired position.

Figure 2:
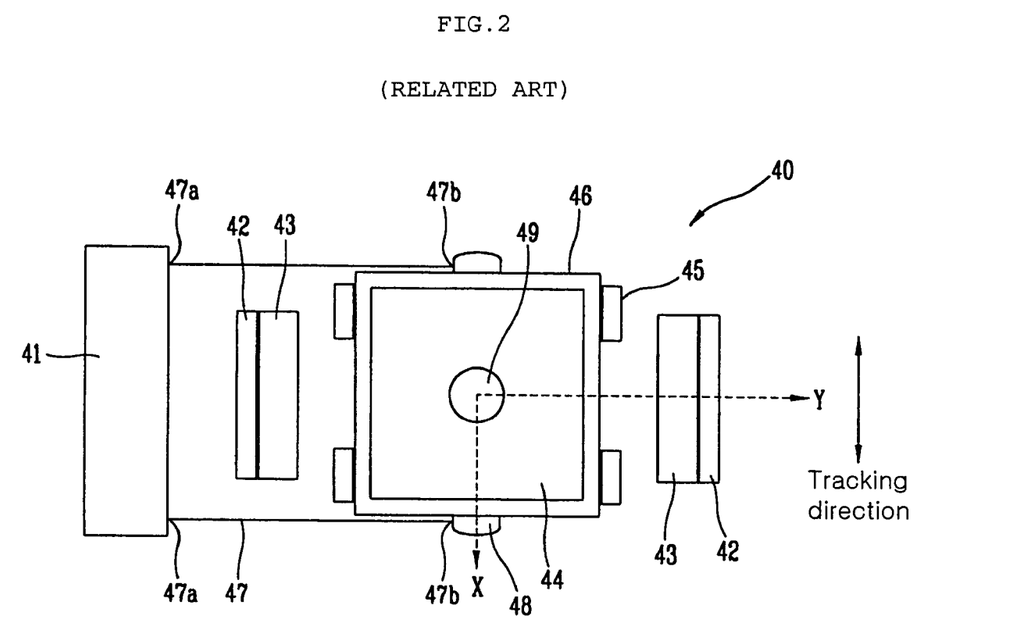
FIG. 2 is a view of an actuator of a prior optical pick-up device.

As shown in FIG. 2, the optical pick-up actuator 40 is comprised of a movable part moving a focus lens 49 in the focusing and tracking directions and a stationary part for supporting the movable part and generating magnetic field.

The movable part has a coil cooperating with a permanent magnet 43 provided on the stationary part to locate the focus lens 49 to the desired position.

That is, the stationary part includes the permanent magnet 43 generating magnetic field, a yoke 42 forming a path of the magnetic field, the fixing frame 41 having a main board (not shown), and wire-shaped springs 47 each having a first end 47a fixed on the fixing frame 41 and a second end fixed on the lens holder 44 to support the lens holder 44 and supply electric current to the lens holder 44.

The movable part includes the focus lens 49 focusing a laser beam eradiated from the laser diode on a recording layer of the optical disk, a lens holder 44 holding the focus lens 49, tracking coils 45 installed on both sides of the lens holder 44 to drive the lens holder 44 in the tracking direction, a focusing coil 46 wound around the lens holder 44 to drive the lens holder 44 in the focusing direction, and a spring fixing unit 48 fixing the spring assembly 47 on the lens holder 44.

The movable part should be designed having a desired frequency property by being fixed by a support having a predetermined rigidity and a predetermined damping property. In addition, the movable part should be designed avoiding unnecessary vibration such as rotation or twist to effectively move in the focusing and tracking directions and reduce the optical signal error.

Figure 5:
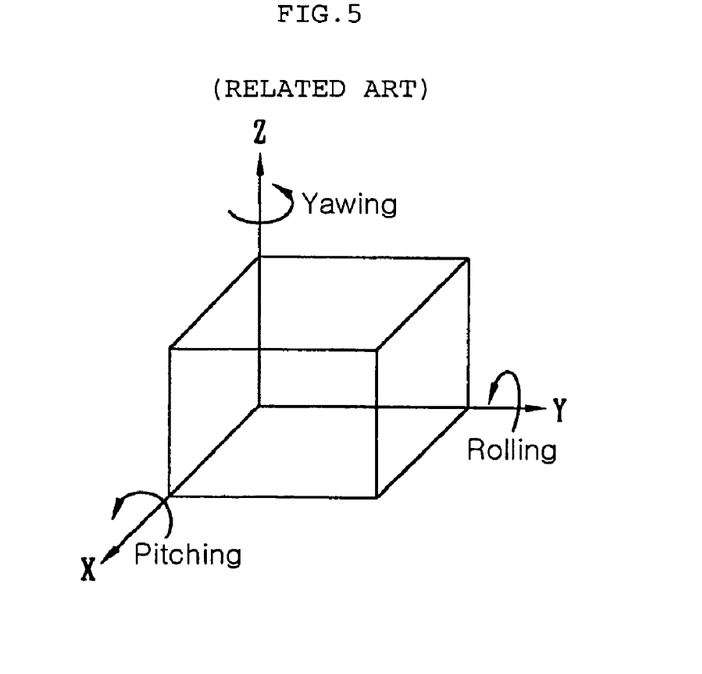
FIG. 5 is a view illustrating rotational directions.

That is, when the movable part drives in the focusing direction, the lens holder 44 should vertically move without rotating in a direction of an X-axis (in the pitching direction shown in FIG. 5). Therefore, as shown in FIG. 3, the spring assembly 47 is comprised of two lower springs and two upper springs stacked on the lower springs that are installed on both sides of the lens holder 44, being extending from the fixing frame 41.

Figure 4:
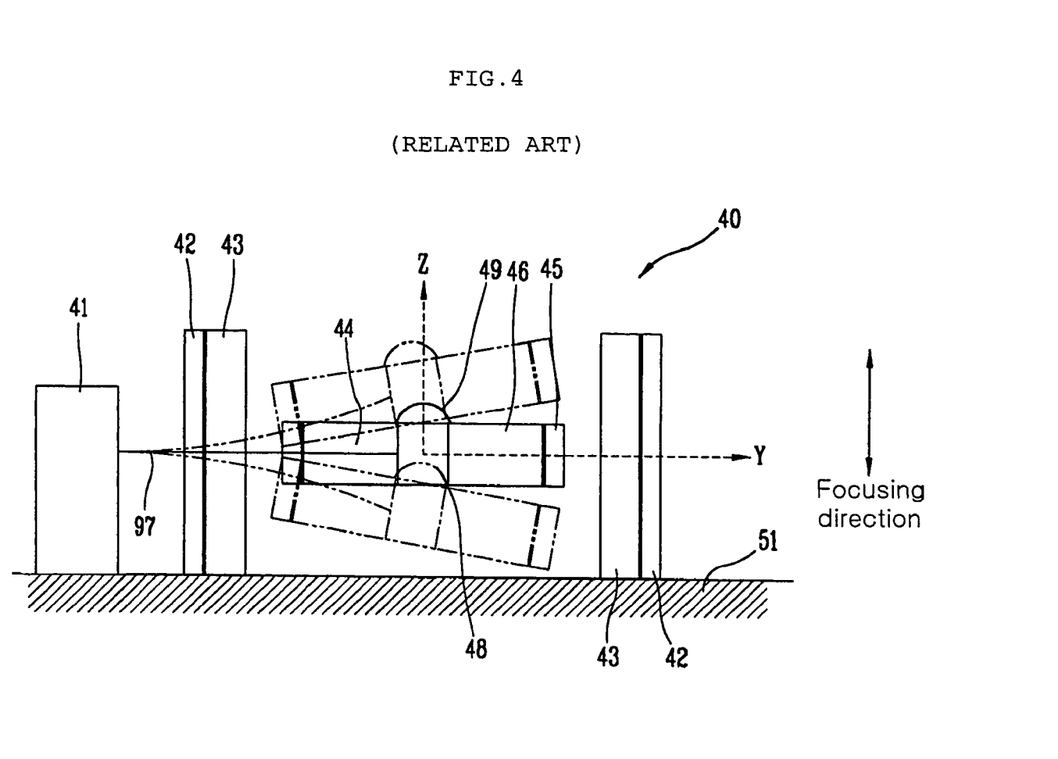

As shown in FIG. 4, in order to eliminate the space limitation in designing the optical pick-up device by reducing a thickness of the actuator, it has been developed that springs 97 may be comprised of one lower spring and one upper spring stacked on the lower spring.

However, in this case, when the optical pick-up device moves in the focusing direction, the lens holder 44 may rotate in the direction of the X-axis, causing the undesired inclination.

Figure 3:
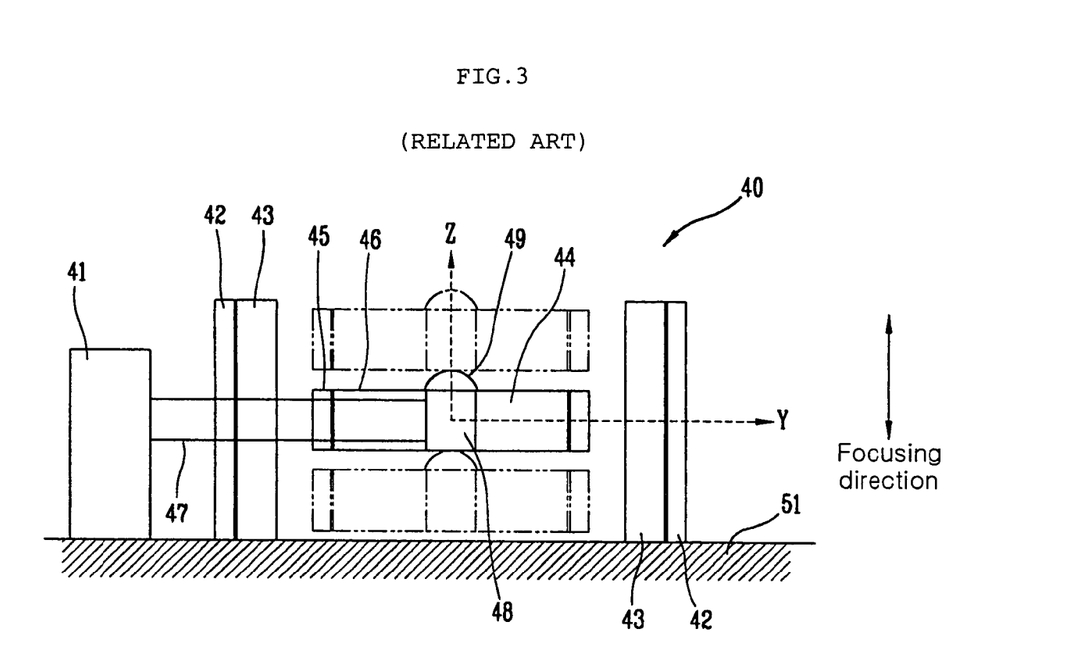
FIGS. 3 and 4 are views illustrating a focusing operation of an actuator of an prior optical pick-up device.

Even when the spring assembly 47 is formed as shown in FIG. 3, an elastic coefficient may be varied when the spring is twisted or tensioned during the manufacturing process.

SUMMARY OF THE INVENTION

Accordingly, the present invention is directed to an actuator of an optical pick-up device that substantially obviates one or more problems due to limitations and disadvantages of the related art.

An object of the present invention is to provide an actuator of an optical pick-up device, which can effectively drive the optical pick-up device and reduce the size of the optical pick-up device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an actuator of an optical pick-up device comprising: two fixing frames; a lens holder disposed between the fixing frames and provided with a focus lens and coils; springs supporting the lens holder, the springs connecting two points of each fixing frame to the lens holder, each spring having one or more bends; a permanent magnet disposed facing the coils to generate magnetic field; and a yoke forming a path of the magnetic field generated by the permanent magnet.

In another aspect of the present invention, there is provided an actuator of an optical pick-up device, comprising: two fixing frames; lens holder disposed between the fixing frames and provided with a focus lens; springs supporting the lens holder by connecting the fixing frames to the lens holder; and a driving force generating unit including a coil and a permanent magnetic to generate driving force for moving the lens holder when control current is applied to the coil.

In still another aspect of the present invention, there is provided an actuator of an optical pick-up device, comprising: a fixing frame; a lens holder having a focus lens; springs connecting the fixing frame to the lens holder to support the lens holder; and a driving force generating unit including a coil and a permanent magnetic to generate driving force for moving the lens holder when control current is applied to the coil.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 6:
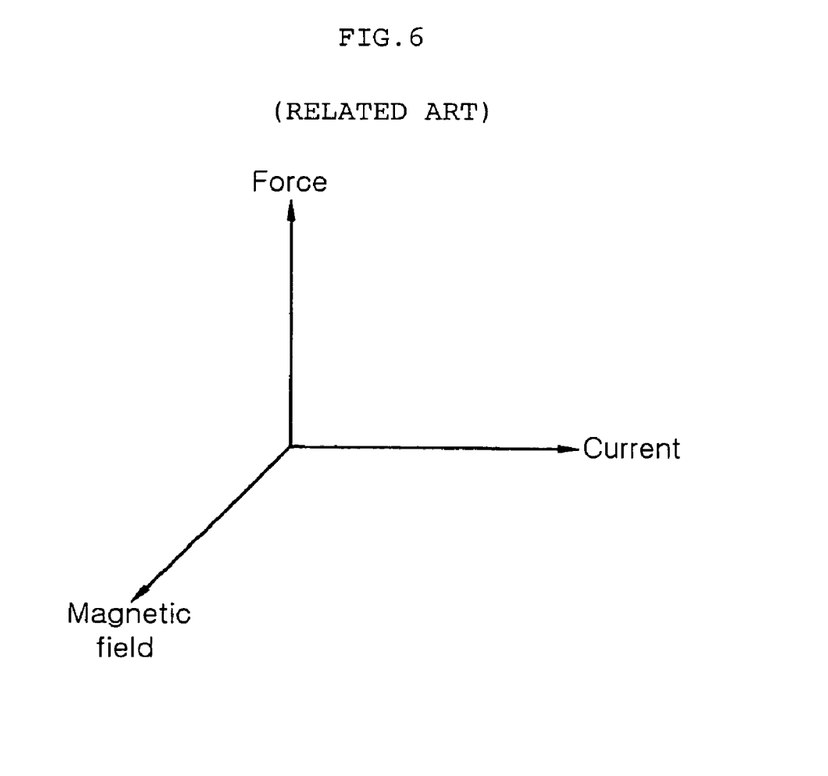
FIG. 6 is a view illustrating Lorentz force.

FIGS. 5 and 6 illustrates an operational theory of an actuator of an optical pick-up device. FIG. 5 illustrates rotational directions and FIG. 6 illustrates Lorentz force.

Rotation around X, Y and Z-axes are respectively called a pitching, rolling and yawing.

As shown in FIG. 6, force applied to the actuator is generated by the combination of magnetic field formed by a permanent magnet and current flowing along a coil.

Figure 7:
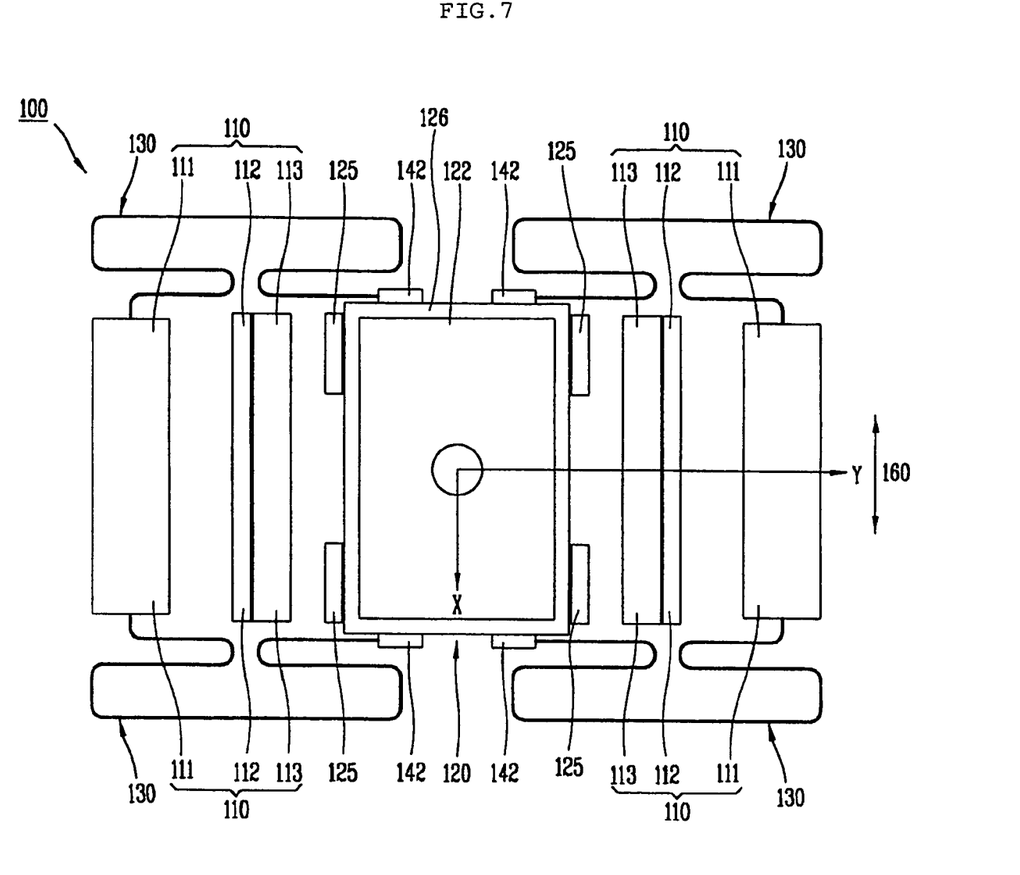
FIGS. 7 and 8 are views of an actuator of an optical pick-up device according to an embodiment of the present invention.
Figure 8:
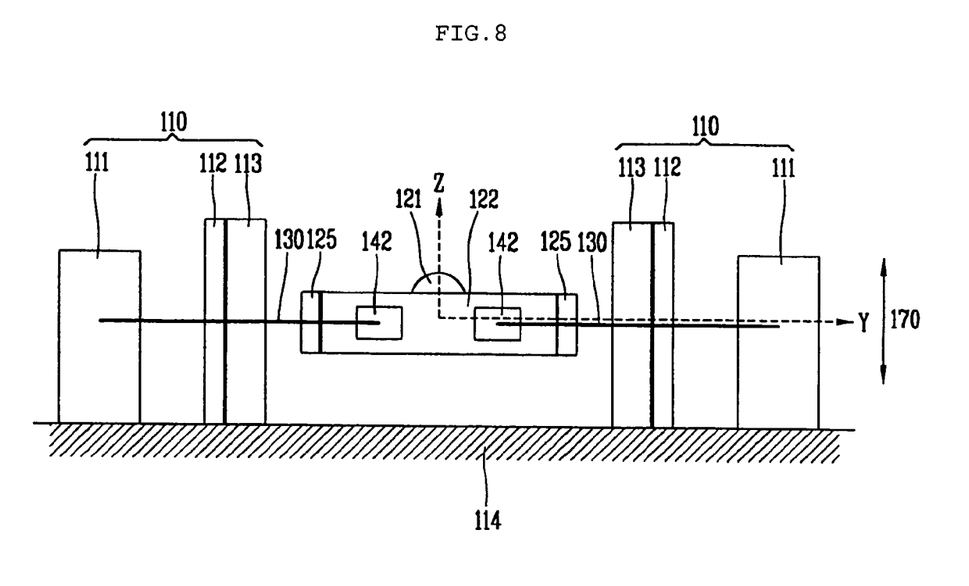

FIGS. 7 and 8 show an actuator of an optical pick-up device according to an embodiment of the present invention.

As shown in the drawings, the inventive optical pick-up actuator 100 includes a movable unit 120 equipped with a focus lens 121 to move in focusing and tracking directions 170 and 160 and a stationary unit 110 supporting the movable part 120 and generating magnetic field.

The stationary unit 110 includes a pair of fixing frames 111 facing each other, a pair of permanent magnets 113 generating the magnetic field, a pair of yokes 112 fixed by pick-up bases 114 to generate a magnetic field path. Leaf springs 130 supports the movable part 120, each having first and second ends respectively fixed on the fixing frame 111 and a spring fixing portion 142 of a lens holder 122.

Particularly, each of the springs 130 is designed in a single step to overcome a space limitation by minimizing a thickness (in a direction of the Z-axis) of the lens holder 122.

The lens holder 122 is designed to be supported at its four points to prevent the unexpected rotation from occurring and to perform the effective movement in the focusing and tracking directions 170 and 160.

Figure 9:
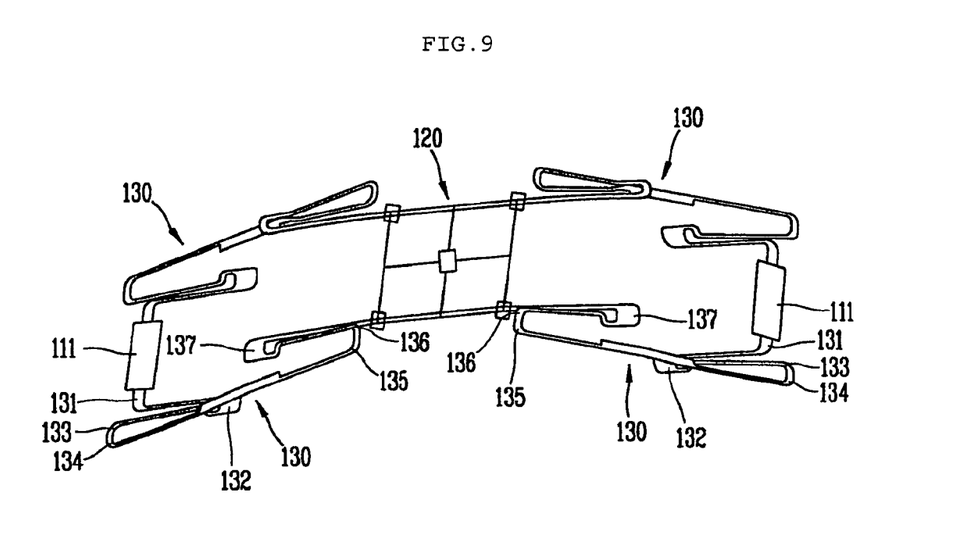
FIG. 9 is a view illustrating a varied state of springs as a lens holder is driven in a focusing direction according to an embodiment of the present invention.
Figure 10:
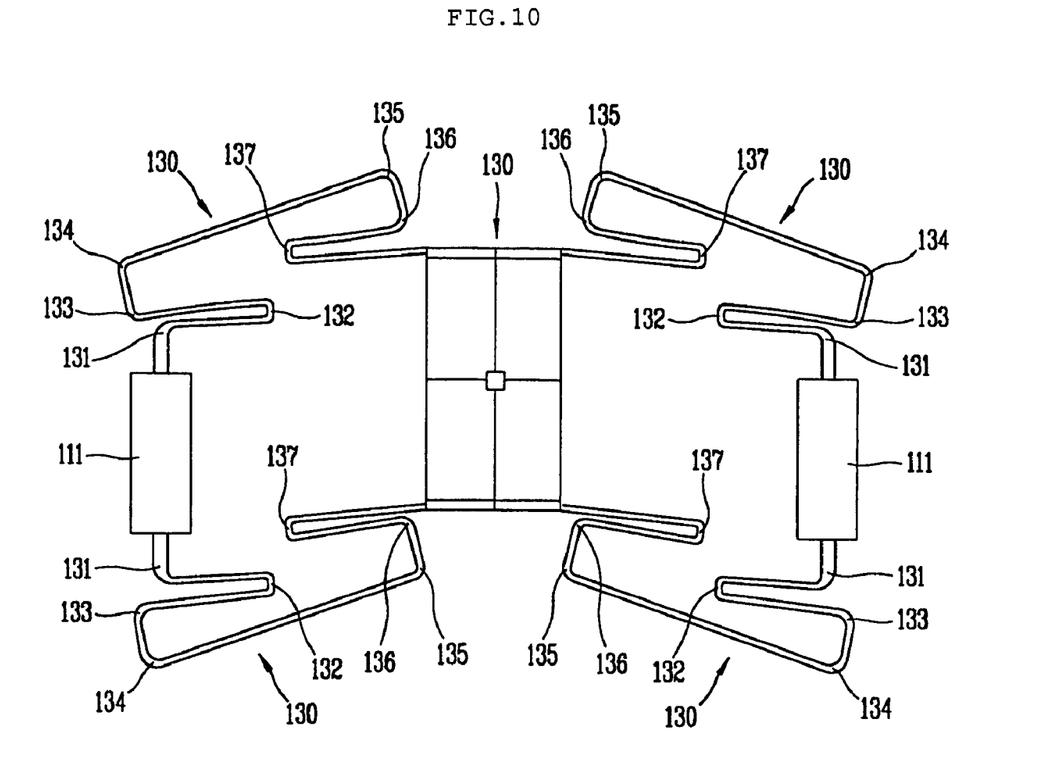
FIG. 10 is a view illustrating a varied state of springs as a lens holder is driven in a tracking direction according to an embodiment of the present invention.

As shown in FIGS. 9 and 10, by forming a plurality of bend portions 131, 132, 133, 134, 135, and 136 on the spring 130, the movement range of the lens holder 122 can be enlarged by twist and bend variations at the bend portions 131, 132, 133, 134, 135, and 136 of the spring 130 without depending on a tensioning variation of the springs 130. In addition, since the springs 130 are less sensitive with respect to a variation of an elastic coefficient according to the twist or bend of the springs 130 that may be incurred in the course of fixing the springs 130 on the lens holder 122 and the fixing frame 111, the driving property of the actuator can be improved.

The spring 130 may be applied to a structure where a single fixing frame is formed as well as the structure where two fixing frames are formed.

Preferably, the springs 130 are installed on the same horizontal plane to effectively control the movement of the lens holder 122 and reduce the thickness of the lens holder 122.

In short, the spring fixing portions 142 where the first ends of the springs 130 are coupled to the lens holder 122 are preferably formed on the same horizontal plane.

In addition, portions where the second ends of the springs 130 are fixed are preferably formed on the same horizontal plane as that where the spring fixing portions 142 are formed.

The movable part 120 includes a focus lens 121 for focusing a laser beam on a recording layer of an optical disk, a lens holder 122 holding the focus lens 121, the lens holder 122 being controlled to be driven in he focusing and tracking direction 170 and 160, tracking coils 125 installed on front and rear surface of the lens holder 122 to drive the lens holder 122 in the tracking direction 160, a focusing coil wound around the lens holder 122 to drive the lens holder 122 in the focusing direction, and the spring fixing portions 142 formed on both ends of the lens holder 122 to connect the springs 130 to the lens holder 122.

The one step springs 130 supports the both ends of the lens holder 122 to prevent the lens holder 122 from being unexpectedly inclined when the movable part 120 is driven.

In addition, since rigidity against the driving force of the lens holder 122 in each direction is reduced, the electromotive force required in controlling the lens holder is reduced. Particularly, since the rigidity in the pitching direction is remarkably lowered, the actuator can be applied as a multiple driving shaft.

That is, by properly apply the electric current to the focusing and tracking coils 126 and 125, the inclined angle control becomes possible according to Lorentz force.

In the above-described actuator, the magnetic filed is formed around the lens holder 122 by the permanent magnets 113. When the current is applied to the focusing coil 126 disposed in the magnetic field, the electromotive force is generated on the focusing coil 126 to drive the lens holder 122 in the focusing direction (in the vertical direction). Likewise, when the current is applied to the tracking coils 125 located in the magnetic field, the electromotive force is generated on the tracking coils 125 to drive the lens holder 122 in the tracking direction (in the left and right directions).

In short, the actuator drives the lens holder 122 to read data recorded on the recording layer of the optical disk by maintaining a focused spot formed on the focus lens 121 at a predetermined size.

An actuator having the focusing and tracking coils formed on the lens holder such that the focusing and tracking coils move together with the lens holder is called a moving coil type actuator. An actuator having the permanent magnet formed on the lens holder 122 such that the permanent magnet moves together with the lens holder is called a moving magnet type actuator. FIGS. 7 and 8 show such a moving coil type actuator.

However, it should be noted that the present invention can be applied to the moving magnet type actuator by exchanging the locations of the permanent magnet with the coils.

It should be further noted that locations of the focusing and tracking coils 126 may be exchanged with each other according to a design selection.

FIG. 9 illustrates a varied state of the springs 130 as the lens holder 122 is driven in the focusing direction according to an embodiment of the present invention and FIG. 10 illustrates a varied state of the springs 130 as the lens holder 122 is driven in the tracking direction according to an embodiment of the present invention.

Each of the springs 130 has the bends 131, 132, 133, 134, 135, and 136 so that the lens holder 122 can be effectively driven by the twist and bending of the bends 131, 132, 133, 134, 135, and 136.

Figure 11:
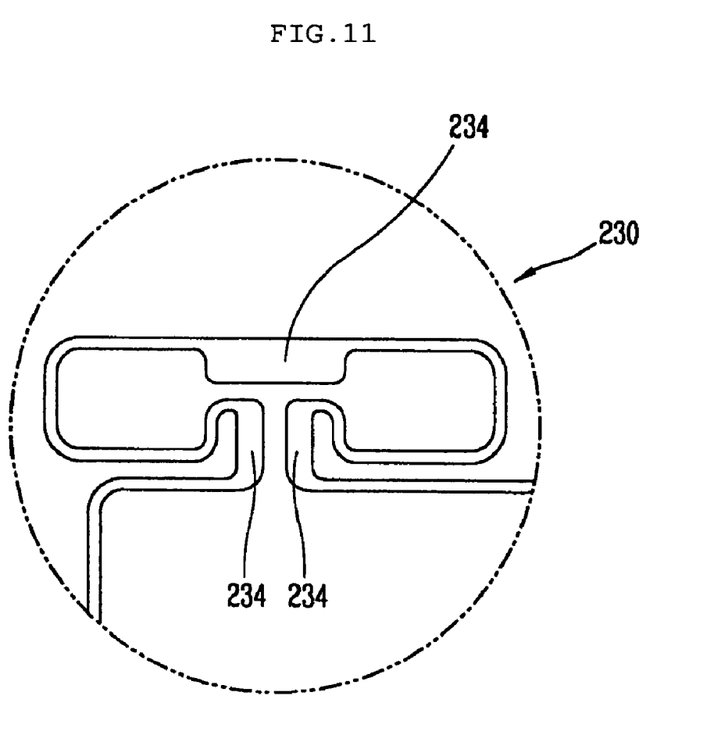
FIG. 11 is a view of a spring assembly of an actuator according to a modified example of the present invention.

FIG. 11 shows a spring 230 of an optical pick-up actuator according to another embodiment of the present invention.

The spring 230 is provided with a damping area 234 having a wider width. Damping material is deposited on the damping area 234.

Figure 12:
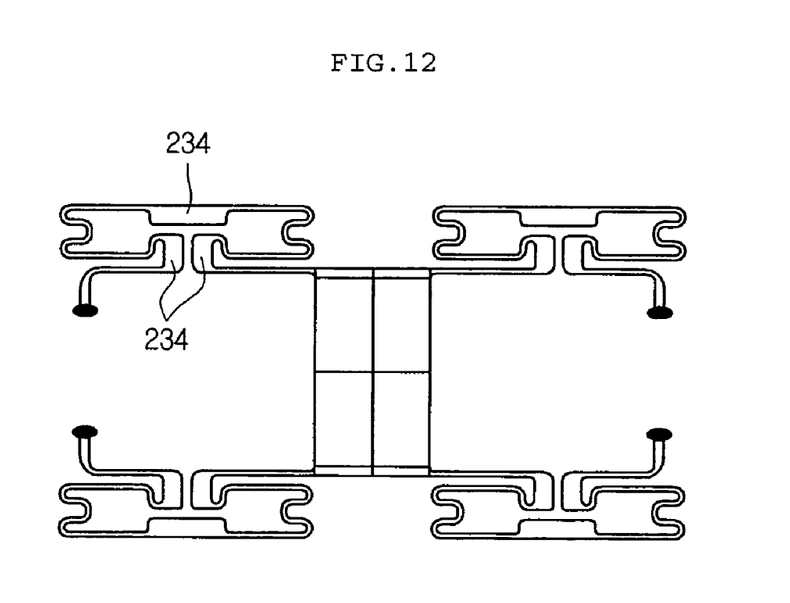
FIGS. 12 through 14 show views illustrating a variety of springs according to modified examples of FIG. 11.
Figure 13:
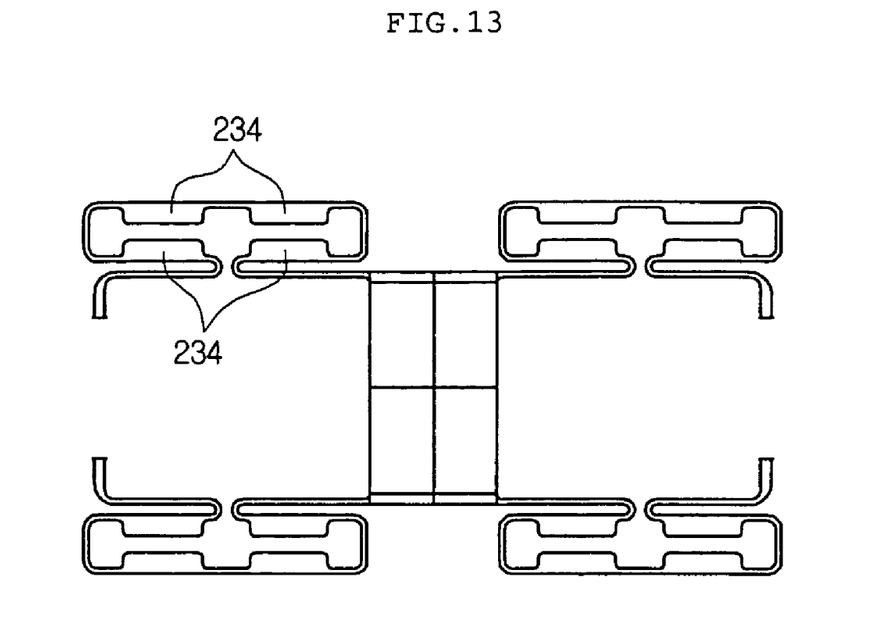
Figure 14:
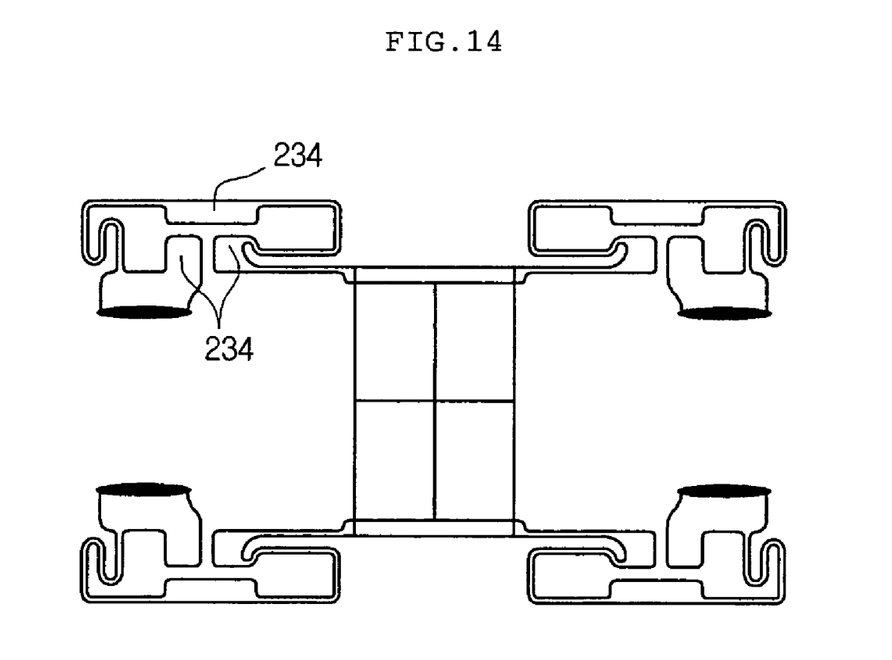

The spring 230 may have a variety of bends. FIGS. 12 and 14 show a variety of modified examples of the springs having different damping areas formed according to the bends.

The damping material such as gel type material is deposited on the damping area 234 and hardened by ultraviolet rays, thereby providing a damping property to the spring. Accordingly, the driving property of the actuator can be more improved.

Figure 15:
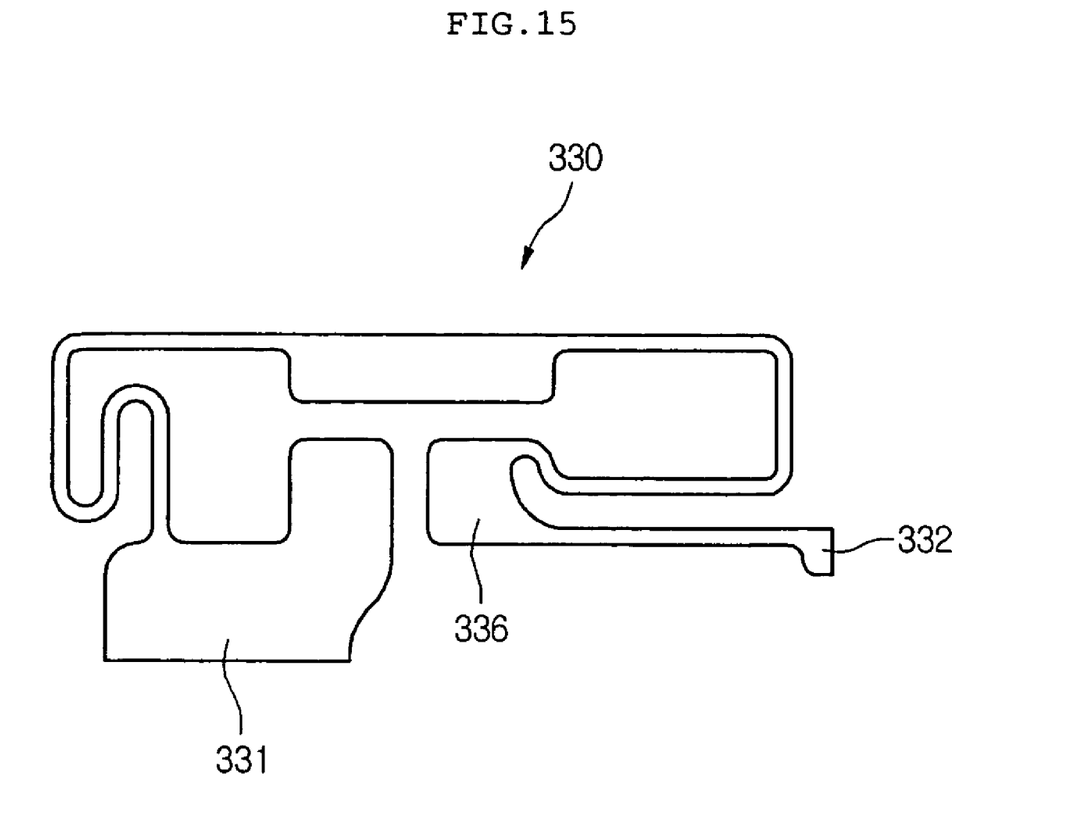
FIG. 15 is a view of a spring of an actuator according to a modified example of the present invention.

FIG. 15 shows a modified example of the spring.

Referring to FIG. 15, a spring of this example has a lens holder coupling portion 332 having a width greater than a portion between the lens holder coupling portion 332 and the first bend 336.

This is for reducing a fixed variation of the spring 330. That is, by differing the width of the lens holder coupling portion 332 from the portion between the lens holder coupling portion 332 and the first bend 336, the rigidities therebetween becomes different from each other.

As a result, an effective area of the spring 330 is defined on a front end of the lens holder coupling portion 332.

The spring coefficient K is generally determined at a less width portion of the spring. However, in this example, since the lens holder coupling portion 332 having the greater width is fixed on the lens holder, the spring coefficient K is increased, thereby reducing the fixed variation.

In addition, the actuator of the present invention has less size and weight compared with the prior actuator. In addition, a mass portion of the springs is about 20-30% of the actuator. Accordingly, the vibration generated by the springs does not remarkably affect the driving property of the actuator.

In order to effectively responding against the vibration of the springs 330 during the drive of the actuator, a stationary portion 331 is formed on a portion where the springs 330 are coupled to the fixing frame.

Figure 16:
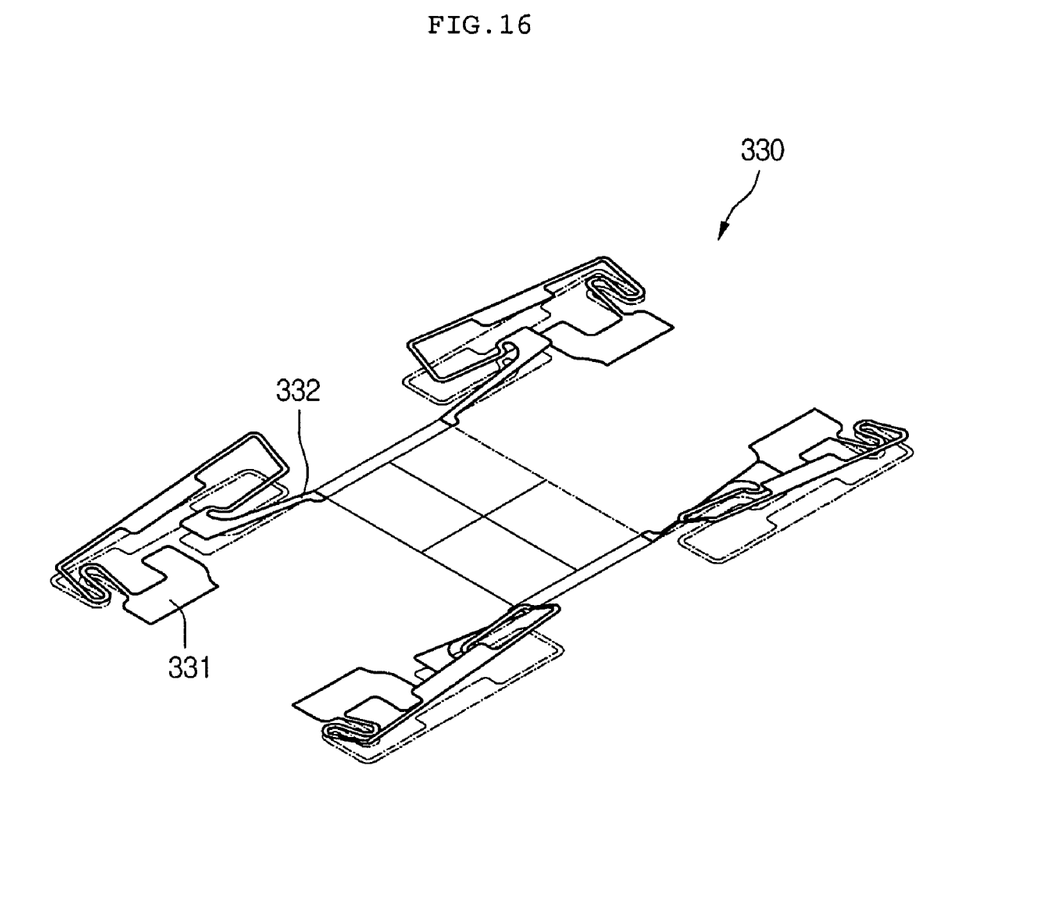
FIG. 16 is a view illustrating a varied state of springs depicted in FIG. 15 as a lens holder is driven in a focusing direction according to an embodiment of the present invention.

Here, the stationary portion 331 is coupled to the fixing frame, having a wider width than other portions. The stationary portion 331 is not affected by the movement of the lens holder, not functioning as the spring 330. That is, as shown in FIG. 16, as the lens holder moves, the spring 330 may be twisted or tensioned. However, the stationary portion 331 is not affected by the movement of the lens holder, being fixed on the fixing frame.

As illustrated in conjunction with FIG. 11, a damper having the damping area 234 deposited with the damping material may be further formed to more effectively response to the vibration.

Figure 17:
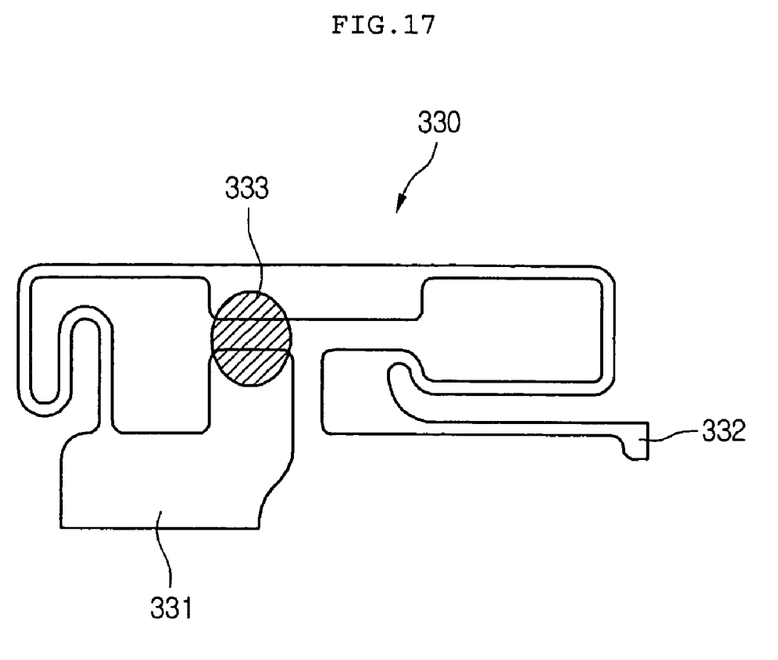
FIGS. 17 through 19 show an embodiment where damping material is deposited according to the present invention.
Figure 18:
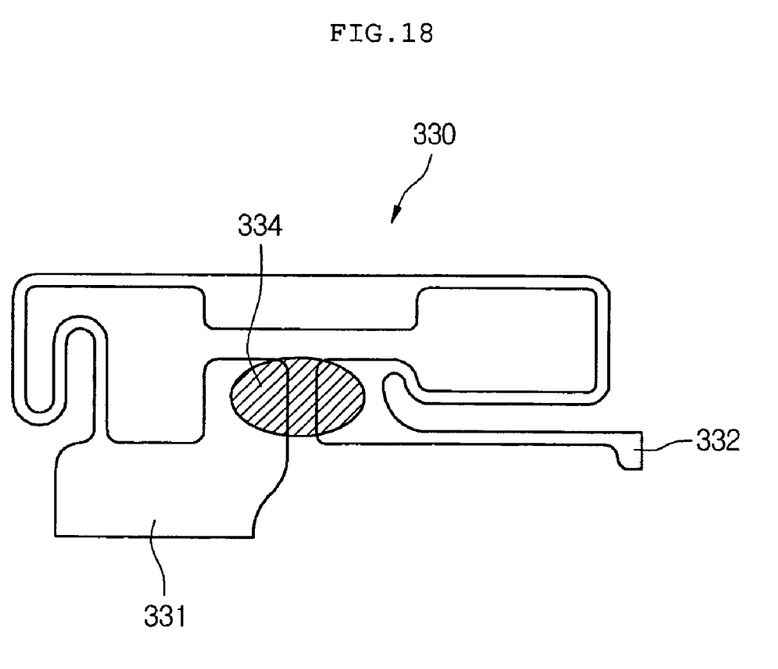
Figure 19:
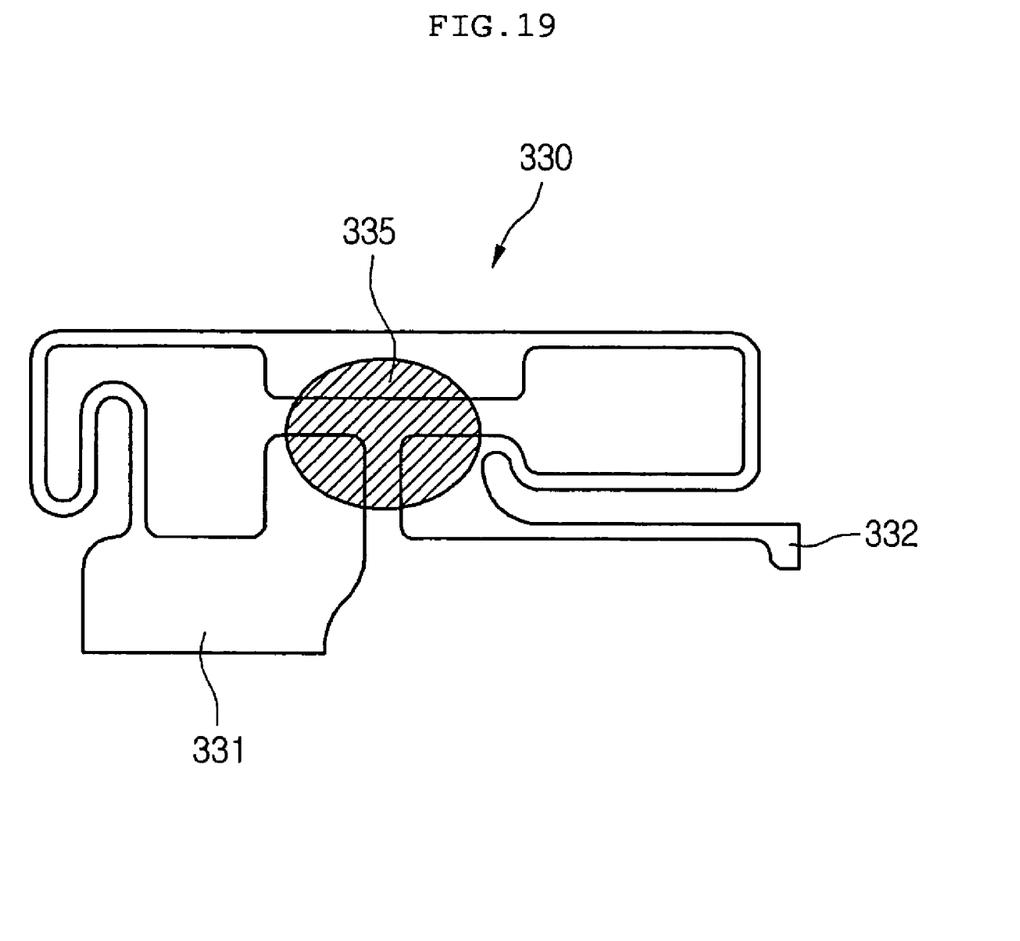

FIGS. 17 through 19 show an example where the damper is deposited on the damping area of the spring.

Dampers 333, 334 and 335 are formed on at least two areas including a damping area 234 of the stationary portion 331 and a damping area 234 of the spring 330.

In the example depicted in FIGS. 17 and 18, the dampers 333 and 334 are formed on the damping area 234 of the stationary portion 331 and the damping area 234 of the spring 330. In FIG. 19, the dampers 335 are formed on the damping area 234 of the stationary portion 311 and two damping areas 234 of the spring 330.

By forming the dampers on the damping area 234 of the stationary portion 131, the unnecessary vibration of the spring 330 can be minimized.

According to the present invention, since the springs are arranged on the same horizontal plane, a thickness of the actuator can be reduced.

In addition, a plurality of bends are formed on the spring, an assembling error caused by twist or bending of the spring can be minimized even when a movable part having small mass is controlled.

Furthermore, the tracking and focusing operations are realized based on the bends of the springs, the actuator can be effectively driven.

The lens holder coupling portion and the stationary portion makes the actuator more precisely driven with less vibration.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An actuator of an optical pick-up device comprising:
    two fixing frames;
    a lens holder disposed between the fixing frames and provided with a focus lens and coils;
    springs supporting the lens holder, the springs connecting two points of each fixing frame to the lens holder, each spring having one or more bends;
    a permanent magnet disposed facing the coils to generate magnetic field; and
    a yoke forming a path of the magnetic field generated by the permanent magnet, wherein the spring is provided with a lens holder coupling portion coupled to the lens holder, the lens holder coupling portion having a width greater than a portion between the lens holder coupling portion and the bend.

2. The actuator according to claim 1, wherein the lens holder is provided with spring fixing portions where the springs are fixed, and the spring fixing portions are formed on the same horizontal plane.

3. The actuator according to claim 2, wherein the spring fixing portions are formed on the same horizontal plane as portions of the fixing frame where the springs are fixed.

4. The actuator according to claim 1, wherein the coils include focusing and tracking coils moving the lens holder in tracking and focusing directions, the tracking coil is disposed facing the fixing frame of the lens holder and the focusing coil wound around the lens holder.

5. The actuator according to claim 1, wherein the spring is provided with a stationary portion coupled to the fixing frame.

6. An actuator of an optical pick-up device comprising:
    two fixing frames;
    a lens holder disposed between the fixing frames and provided with a focus lens and coils;
    springs supporting the lens holder, the springs connecting two points of each fixing frame to the lens holder, each spring having one or more bends;
    a permanent magnet disposed facing the coils to generate magnetic field; and
    a yoke forming a path of the magnetic field generated by the permanent magnet, wherein the spring is provided with a damping area adjacent to the bend, the damping area being deposited with damping material.

7. The actuator according to claim 6, wherein the spring is further provided with a stationary portion, the stationary portion being deposited with the damping material.

8. An actuator of an optical pick-up device, comprising:
    two fixing frames;
    lens holder disposed between the fixing frames and provided with a focus lens;
    springs supporting the lens holder by connecting the fixing frames to the lens holder; and
    a driving force generating unit including a coil and a permanent magnetic to generate driving force for moving the lens holder when control current is applied to the coil,
    wherein the spring is provided with a lens holder coupling portion coupled to the lens holder, the lens holder coupling portion having a width greater than a portion between the lens holder coupling portion and the bend.

9. The actuator according to claim 8, wherein the coil is formed on the lens holder and the permanent magnet is disposed facing the coil.

10. The actuator according to claim 8, wherein the permanent magnet is formed on the lens holder and the coil is disposed facing the permanent magnet.

11. The actuator according to claim 8, wherein the springs are fixed on tour spring fixing portions formed on the lens holder, the spring fixing portions being disposed on the same horizontal plane.

12. The actuator according to claim 8, wherein the spring is provided with one or more bends.

13. An actuator of an optical pick-up device, comprising:
    two fixing frames;
    lens holder disposed between the fixing frames and provided with a focus lens;
    springs supporting the lens holder by connecting the fixing frames to the lens holder; and
    a driving force generating unit including a coil and a permanent magnetic to generate driving force for moving the lens holder when control current is applied to the coil,
    wherein the spring has at least two damping areas adjacent to the bend, the damping areas being deposited with damping material.

14. The actuator according to claim 13, wherein the spring is provided with a damping area adjacent to the bend and a stationary portion, the damping area and the stationary portion being deposited with damping material.

15. An actuator of an optical pick-up device, comprising:
    a fixing frame;
    a lens holder having a focus lens;
    springs connecting the fixing frame to the lens holder to support the lens holder; and
    a driving force generating unit including a coil and a permanent magnetic to generate driving force for moving the lens holder when control current is applied to the coil,
    wherein the spring is provided with a lens holder coupling portion coupled to the lens holder, the lens holder coupling portion having a width greater than a portion between the lens holder coupling portion and the bend.

16. An actuator of an optical pick-up device, comprising:
a fixing frame;
a lens holder having a focus lens;
springs connecting the fixing frame to the lens holder to support the lens holder; and
a driving force generating unit including a coil and a permanent magnetic to generate driving force for moving the lens holder when control current is applied to the coil,
wherein the spring has at least two damping areas adjacent to the bend, the damping areas being deposited with damping material.

17. The actuator according to claim 16, wherein the spring is provided with a damping area adjacent to the bend and a stationary portion, the damping area and the stationary portion being deposited with damping material.

* * * * *